United States Patent [19]

White et al.

[11] 4,357,443

[45] Nov. 2, 1982

[54] ONE PACKAGE, MOISTURE CURABLE, ORGANOPOLYSILOXANE COMPOSITIONS AND METHOD FOR MAKING

[75] Inventors: Mary A. White, El Cerrito, Calif.; Diane V. Brezniak, Clifton Park, N.Y.

[73] Assignee: General Electric Company, Schenectady, N.Y.

[21] Appl. No.: 316,456

[22] Filed: Oct. 30, 1981

[51] Int. Cl.³ .................................. C08L 43/00
[52] U.S. Cl. ........................ 524/860; 528/19; 528/34; 528/901
[58] Field of Search ............. 528/19, 34, 901; 524/860

[56] References Cited

U.S. PATENT DOCUMENTS 3,334,066  8/1967  Lamoreaux .
3,433,758  3/1969  Thomas .................... 528/19
3,457,224  7/1969  Thomas .................... 528/19

OTHER PUBLICATIONS

Riechel et al., Electrochemical Studies of Vanadium (III)–(IV), and –(V) Complexes of 8-Quinolinol in Acetonitrile, Formation of Binuclear Mixed-Valence (IV, V) Complex, Inorg. Chem., vol. 14, No. 8, (1975), pp. 1869–1875.

Pasquali et al., (Pyridine)bis(8-quinolinato)oxovanadium (IV): A Free-Radical-Like Metal Center in Reactions with Dioxygen, p-Benzoquinone, and Aromatic Nitroso Compounds, Inorg. Chem., vol. 18, No. 9, (1979), pp. 2397–2400.

Pasquali et al., J.C.S. Dalton, (1977), pp. 139–144, Oxovanadium (IV) Complexes Containing Bidentate Schiff-base Ligands: Synthesis and Structural and Spectroscopic Data.

Cotton et al., Advanced Inorganic Chemistry, A Comprehensive Text., 4th Ed., (1980), John Wiley & Sons, Inc.

*Primary Examiner*—Melvyn I. Marquis
*Attorney, Agent, or Firm*—William A. Teoli; James C. Davis, Jr.

[57] ABSTRACT

One package moisture curable organopolysiloxane compositions are provided based on the use of a silanol-terminated polydiorganosiloxane, an alkoxy silane crosslinking agent and a vanadium compound as a curing catalyst. The moisture curable organopolysiloxane compositions are non-corrosive and substantially odor-free.

6 Claims, No Drawings

ONE PACKAGE, MOISTURE CURABLE, ORGANOPOLYSILOXANE COMPOSITIONS AND METHOD FOR MAKING

CROSS REFERENCE TO RELATED APPLICATIONS

Reference is made to copending applications RD-13275, Mary Ann White et al, for One Package, Stable, Moisture Curable, Polyalkoxy terminated Organopolysiloxane Compositions and Method for Making, filed June 26, 1981, Ser. No. 277,524 assigned to the same assignee as the present invention.

BACKGROUND OF THE INVENTION

Prior to the present invention, various one and two-package moisture curable room temperature vulcanizable (RTV) compositions were available based on the use of a silanol-terminated polydiorganosiloxane consisting essentially of from about 50 to about 2500 chemically combined units of the formula,

$$-\underset{R}{\overset{R}{SiO}}-, \quad (1)$$

where R is a $C_{(1-13)}$ monovalent substituted or unsubstituted hydrocarbon radical, which is preferably methyl, or a member selected from phenyl, cyanoethyl, trifluoropropyl, vinyl, and mixtures thereof. The silanol-terminated polydiorganosiloxane of formula (1) was generally mixed with a cross-linking silane having hydrolyzable radicals attached to silicon and a condensation catalyst, such as a tin compound or a titanium compound. In some instances undesirable by-products such as acetic acid, were formed as a result of the cure of the room temperature vulcanizable organopolysiloxane compositions which generated a disagreeable odor or which rendered the organopolysiloxane composition corrosive, or both.

The present invention is based on the discovery that substantially odor-free and non-corrosive one-package room temperature vulcanizable RTV compositions can be made by mixing together an effective amount of a vanadium compound defined hereinafter, with an alkoxysilane crosslinking agent having the formula,

$$(R^1O)_{4-a}\overset{(R^2)_a}{\underset{|}{Si}}, \quad (2)$$

where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and a is a whole number equal to 0 or 1, and a silanol-terminated polydiorganosiloxanes consisting essentially of chemically combined units of formula (1). Preferably, the vanadium compound utilized in the practice of the present invention has the formula, $$VO(OR^3)_3, \quad (3)$$

where $R^3$ is a member selected from the class consisting of a silyl radical and a $C_{(1-13)}$ organic radical. Unexpectedly, the vanadium compound provides (RTV) compositions having unusually fast tack-free times (in minutes) after accelerated aging, as compared to various RTV compositions of the prior art containing either a tin compound or titanium compound as a condensation catalyst.

The above results are also quite surprising in view of Lamoreaux U.S. Pat. No. 3,334,066 assigned to the same assignee as the present invention directed to a curable composition comprising a trialkoxy vanadate and a silanol-containing organopolysiloxane. Unlike the moisture curable compositions of the present invention utilizing an alkoxy silane cross-linking agent, the curable composition of Lamoreaux, are cured by application of heat. In some instances, separation of an organic solvent also has been found to facilitate cure in the practice of the Lamoreaux method.

STATEMENT OF THE INVENTION

There is provided by the present invention, a one-package, room temperature vulcanizable organopolysiloxane compositions comprising by weight, (A) 100 parts of a silanol-terminated polydiorganosiloxane consisting essentially of chemically combined units of formula (1), (B) 0.05 to 10 parts of an alkoxy silane of formula (2) and (C) an effective amount of a $V^{+3}$ to $V^{+5}$ inclusive vanadium compound soluble in the room temperature vulcanizable composition, or a $V^{+3}$ to $V^{+5}$ inclusive vanadium compound insoluble in the room temperature vulcanizable composition, but capable of forming soluble hydrolysis products upon contact with atmospheric moisture while in the presence of the room temperature vulcanizable organopolysiloxane composition.

Some of the cross-linking polyalkoxysilanes included within formula (2) are, for example, methyltrimethoxysilane; methyltriethoxysilane; ethyltrimethoxysilane; tetraethoxysilane; vinyltrimethoxysilane; etc.

In addition to formula (3), there are included among the vanadium compounds which can be used in the practice of the present invention, vanadium compounds which are soluble in the RTV composition and vanadium compounds which may be initially insoluble in the RTV composition, but which hydrolyze to soluble materials upon contact with atmospheric moisture.

Some of the soluble oxygen containing vanadium compounds are as follows:

$V^{+5}$

Oxohalides and adducts thereof such as $VOX_3$, $VOX_3$ (solvent) i.e., $VOX_3[N(C_2H_5)_3]_2$, $VOX_3(CH_3CN)_2$, where X is F, Cl, Br;

Alkoxides such as $VO(OR^3)_3$, where $R^3$ is a $C_{(1-13)}$ monovalent hydrocarbon radical, i.e., $VO(OCH(CH_3)_2)_3$, $VO(OCH_3)_3$, $VO(OCH_2CH_3)_3$, $VO(OC(CH_3)_3)_3$;

Mixed alkoxides such as $VO(OCH_3)(OCH(CH_3)_2)_2$, $VO(OCH_3)_2(OCH(CH_3)_2)$, $VO(OCH_3)(OCH(CH_3)_2)(OCH_2CH_3)$;

Siloxides and mixed siloxides such as $VO(OSi(CH_3)_3)_3$, $VO(OSi(CH_2CH_3)_3)_3$, $VO(OSi(CH_3)_2OSi(CH_3)_2OSi(CH_3)_3)_3$, $VO(OSi(CH_3)_3)(OSi(CH_2CH_3)_3)_2$, etc.;

Polymeric siloxy vanadates such as  $VO(OSi(CH_3)_2O)_3VO(OSi(CH_3)_2O)_3[VO(OSi(CH_3)_2)_2]_n$;

Peroxovanadates such as $(OCH_3)VO(O\text{-}O^-)$, $(OCH_3)_2VO(O\text{-}O^-)$, $(C_5H_7O_2)VO(O-O^-)$,
$(C_5H_7O_2)_2VO(O-O^-)$,
$VO(O-O^-)_2NH_3$,
$VO(O-O^-)_2$oxalate;
μ-peroxo and μ-oxo vanadates such as

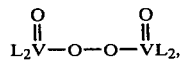

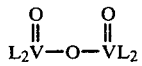

where L is acetylacetonate, oxine, oxalate, salicylaldehyde, or substituted acetylacetonate, etc.;
Chelates and adducts such as

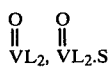

where L is the same as above and 1:1 adducts with bases such as pyridine, methylamine, isoquinoline, etc.

$V^{+4}$

Halides and adducts such as $VOX_2$, $VOCl_2.3CH_3OH$, $VOCl_2(2pyridine)$, $VOCl_2(2\text{ pyridine})(2\text{ }CH_3OH)$;
Pseudohalides such as $VO(NCS)_2$ (2dioxane);
Sulfates such as $VOSO_4(3\text{-dimethylsulfoxide})$;
Chelates such as $VO(C_5H_7O_2)_2$, $VO(\text{oxine})_2$, $VO(\text{ortho-phenanthroline})F_2$, $VO(2,2'\text{bipyridine})F_2$, $VO(\text{ortho-phenanthroline})(SO_4)$, $VO(2,2'\text{-bipyridine})_2NCS$;
Alkoxides such as $V(OR)_4$, i.e., $V(OCH_2CH_3)_4$
Schiff bases, such as VO(Schiff base), i.e., salicylaldehydeethylenediimine, salicylaldehydetrimethylenediimine, salicylaldehydediphenylethylenediimine, etc.;
Carboxylate complexes such as

where $R^4$ can be a $C_{(1-13)}$ hydrocarbon radical, for example,

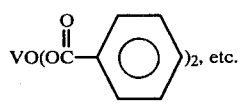

Complex ions, i.e., [VO₂ethylenediaminetetraaceticacid]X₃, [VO₂oxalate₂]X₃, [VO(ethylenediamine)₂]X₂, [VO(2,2'-bipyridine)₂]X₂, where X is a counterion.

As indicated above, some of the vanadium compounds, which include $V^{+3}$ to $V^{+5}$ inclusive may be initially insoluble in the RTV composition, but can form hydrolysis products upon exposure to atmospheric moisture which are soluble in the RTV composition. There are included among the following vanadium compounds, insoluble compounds which form soluble products upon hydrolysis. In certain instances, the hydrolysis products of some of these vanadium compounds are shown.

$V^{+5}$ $V_2O_5$, $VO_4^{3-}$, $V_{10}O_{28}^{6-}$, $VO_2^{30}$, etc.;
Peroxides, i.e., $[VO(O-O^-)]^+$, $[VO(O-O^-)_2]^-$, etc.

$V^{+4}$ $V_2O_4$, $VO_2$, $V_{18}O_{42}^{2-}$, etc.

$V^{+3}$ $[V(H_2O)_6]^{3+}$, $V_2O_3$.

Some of the above vanadium compounds can be made by various procedures known to the art, for example: F. Albert Cotton and Geoffrey Wilkinson, "Advanced Inorganic Chemistry—A Comprehensive Text", John Wiley' Sons, 1980 (4th ed.) New York; Joel Selbin, Chem. Reviews, 65 (2), 153 (1965); Marco Pasquali, Alberto Landi, and Carlo Floriani, Inorg. Chem. 18 (9), 2397 (1979); Fulvio DiFuna, Giorgio Modena, Recl. Trav. Chim. Pays-Pas, 98 (4) (1979); G. A. Dean, Can. J. Chem, 39 1174 (1961); Marco Pasquali, Fubio Marchetti, Carlo Floriani, JCS Dalton, 139 (1977).

Radicals included within R and $R_2$ of formulas (1) and (2) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals.

Radicals included by $R^3$ of formula (3) are more particularly $C_{(1-8)}$ alkyl radicals such as methyl, ethyl, propyl, butyl, pentyl, etc.; $C_{(6-13)}$ aryl radicals and substituted aryl radicals such as phenyl, chlorophenyl, methoxyphenyl, etc. In addition, $R^3$ can be $-OSi(R^4)_3$, $-(OSi(R^4)_2)_nOSi(R^4)_3$, where $R^4$ are selected from radicals as previously defined and n is an integer equal to 1 to 5 inclusive. In formula (3) where $R^3$ and $R^4$ radicals can be the same or different radicals as previously defined.

Silanol-terminated silicone polymers consisting essentially of formula (1) units are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclo tetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention the room temperature vulcanizable compositions can be made by agitating, for example stirring a mixture of materials which can consist of the silanol-terminated polydiorganosiloxane, the cross-linking silane and the vanadium compound. Blending is performed under substantially anhydrous conditions. Blending temperatures can vary from about 0° C. to about 180° C. depending upon the degree of mixing, the type and amount of filler.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. The expression "effective amount of the vanadium compound" means 0.3 to 5 parts of vanadium compound, per 100 parts of silanol terminated polydiorganosiloxane can be used, and preferably 1.1 to 2.0 parts of oxygen containing vanadium compound.

In order that those skilled in the art will be better able to practice the present invention, the following examples are given by way of illustration and not by way of limitation. All parts are by weight unless otherwise indicated.

EXAMPLE 1

There was mixed under substantially anhydrous conditions 100 parts of a silanol terminated polydimethylsiloxane containing 0.09% by weight of hydroxy radicals, 3.2 parts of methyltrimethoxysilane and 1.2 part of VO-$(OiC_3H_7)_3$. The resulting mixture was poured into vials. The vials were capped and placed in a 50° C. oil bath. Periodically, samples were removed from the bath, allowed to cool under substantially anhydrous conditions and thereafter allowed to cure in an atmosphere at 60% relative humidity. Tack-free times were determined by touching the surface of the cured samples.

Additional room temperature vulcanizable compositions were prepared and tested following the same procedure, except there was used 4.4 parts of methyltrimethoxysilane and 5.5 parts of a titanium compound consisting of a titanium atom substituted with 2 acetylacetonate groups and 2 isopropoxide groups. In addition to the aforementioned titanium compound an additional room temperature vulcanizable composition was prepared utilizing 4 parts of the methyltrimethoxysilane and 0.5 part of dibutyltindiacetate.

The various RTV formulations were then evaluated for tack-free time by pouring the respective mixtures in aluminum pans under atmospheric conditions after accelerated aging at 50° C. over a period of from about 1 to 30 days. The following results were obtained, where "V" under catalyst indicates the RTV composition containing the vanadium catalyst, "Ti" indicates the RTV composition containing the titanium catalyst, "Sn" indicates the RTV composition containing the tin catalyst and "TFT" indicates tack-free time in minutes:

| Catalyst | Aging at 50° C. (days) | TFT (min) |
|---|---|---|
| V  | 0  | <15 |
| "  | 1  | 10 |
| "  | 4  | 71 |
| "  | 29 | 92 |
| Ti | 0  | 120 |
| "  | 1  | 240 |
| "  | 4  | 450 |
| "  | 7  | 1800 |
| "  | 13 | no cure |
| Sn | 0  | 75 |
| "  | 1  | no cure |

The above results show that the room temperature vulcanizable compositions of the present invention containing the vanadium catalyst possess superior stability over an extended accelerated shelf period as compared to conventional condensation catalyst of the prior art.

EXAMPLE 2

Room temperature vulcanizable compositions were prepared utilizing the silanol-terminated polydimethylsiloxane and the vanadium catalyst of Example 1, and methyltrimethoxysilane cross-linker. In one instance, a room temperature vulcanizable composition was prepared free of the methyltrimethoxysilane cross-linker. The amounts of the ingredients utilized in the various room temperature vulcanizable compositions are shown below in parts by weight, where "RTV" is the total mixture, "polymer" is the silanol-terminated polydimethylsiloxane, "cross-linker" is methyltrimethoxysilane and "vanadium compound" is the aforementioned vanadium compound of Example 1:

| RTV | Polymer | Cross-linker | Vanadium Compound |
|-----|---------|--------------|-------------------|
| 1 | 100 | 2.0 | 1.2 |
| 2 | 100 | 1.4 | 1.3 |
| 3 | 100 | .73 | 1.3 |
| 4 | 100 | .38 | 1.3 |
| 5 | 100 | 0 | 1.2 |

The above mixtures were subjected to accelerated aging for three days at 100° C. The aged samples were allowed to come to room temperature before exposure to moisture in aluminum pans. The following table summarizes the results obtained, where "TFT (mins)" as defined in Example 1 were measured immediately after aforementioned mixtures were prepared and exposed to atmospheric moisture and after 3 days at 100° C.:

| RTV | TFT (Min) 25° C. | TFT (Min) 100° C. 3 days |
|-----|------------------|--------------------------|
| 1 | 8 | >1440 |
| 2 | 10 | 169 < TFT ≦ 1099 |
| 3 | 5 | 117 |
| 4 | 13 | 25 |
| 5 | 13 | 6$^a$ |

$^a$surface is not tacky but the sample did not cure through

The above results show that the tack-free times of the various RTV's were substantially the same after they were initially mixed in a dry box and thereafter exposed to atmospheric moisture. However, the results shown after the RTV's were heat aged for three days at 100° C. and then exposed to atmospheric moisture, indicates that the mixture free of the methyltrimethoxysilane cross-linker did not cure.

Although the above examples are directed to only a few of the very many variables included in the room temperature vulcanizable compositions of the present invention, it should be understood that the present invention includes a much broader variety of RTV compositions comprising silanol-terminated polydiorganosiloxanes consisting essentially of chemically formula (1) units, alkoxy silanes of formula (2) and vanadium compound of formula (3).

What I claim as new and desire to secure by Letters Patent of the United States is:

1. One-package, room temperature vulcanizable organopolysiloxane compositions comprising by weight,
    (A) 100 parts of a silanol-terminated polydiorganosiloxane consisting essentially of chemically combined units of the formula,

(B) 0.1 to 10 parts of an alkoxy silane of the formula and

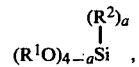

(C) an effective amount of either a $V^{+3}$ to $V^{+5}$ inclusive vanadium compound soluble in the room temperature vulcanizable organopolysiloxane composition, or a $V^{+3}$ to $V^{+5}$ inclusive vanadium compound insoluble in the room temperature vulcanizable organopolysiloxanee composition, but capable of forming soluble hydrolysis products upon contact with atmospheric moisture while in the presence of the room temperature vulcanizable organopolysiloxane composition.

2. A room temperature vulcanizable composition in accordance with claim 1, where the vanadium compound has the formula,

where $R^3$ is a member selected from the class consisting of a silyl radical and a $C_{(1-13)}$ organic radical.

3. A room temperature vulcanizable composition in accordance with claim 1, where the vanadium compound is $VO(OiC_3H_7)_3$.

4. A room temperature vulcanizable composition in accordance with claim 1, where the silanol-terminated polydiorganosiloxane is a silanol-terminated polydimethylsiloxane.

5. A room temperature vulcanizable composition in accordance with claim 1, where the alkoxy silane cross-linking agent is methyltrimethoxysilane.

6. A room temperature vulcanizable organopolysiloxane composition in accordance with claim 1, reinforced with a silica filler.

* * * * *